United States Patent [19]

Sasaki et al.

[11] Patent Number: 4,783,501

[45] Date of Patent: Nov. 8, 1988

[54] METHOD FOR PREPARING A POLYMERIC COMPOSITION

[75] Inventors: Isao Sasaki, Hiroshima; Nobuhiro Mukai; Hitoshi Ige, both of Otake, all of Japan

[73] Assignee: Mitsubishi Rayon Co., Ltd., Tokyo, Japan

[21] Appl. No.: 898,496

[22] Filed: Aug. 21, 1986

[30] Foreign Application Priority Data

Aug. 29, 1985 [JP] Japan ................. 60-188642
Aug. 29, 1985 [JP] Japan ................. 60-188643

[51] Int. Cl.$^4$ ............................................ C08K 3/02
[52] U.S. Cl. ................... 524/701; 524/783; 524/789; 524/814
[58] Field of Search ............... 524/701, 783, 814, 789

[56] References Cited

U.S. PATENT DOCUMENTS

| | | | |
|---|---|---|---|
| 3,265,644 | 8/1966 | Herman et al. | 524/789 |
| 3,868,347 | 2/1975 | Sabel et al. | 524/789 |
| 3,884,871 | 5/1975 | Herman et al. | 524/817 X |
| 3,904,568 | 9/1975 | Yamaguchi et al. | 524/789 |
| 4,251,576 | 2/1981 | Osborn et al. | 524/789 |
| 4,421,660 | 12/1983 | Solc nee Hajna | 524/789 |
| 4,433,097 | 2/1984 | Tawada et al. | 524/789 |
| 4,435,540 | 3/1984 | Kishida et al. | 524/780 |
| 4,508,761 | 4/1985 | Miyoshi et al. | 524/789 |
| 4,546,145 | 10/1985 | Kishida et al. | 524/789 |
| 4,678,819 | 7/1987 | Sasaki et al. | 524/789 |

FOREIGN PATENT DOCUMENTS

| | | | |
|---|---|---|---|
| 0080412 | 6/1980 | Japan | 524/789 |
| 6161461 | 12/1981 | Japan | 524/789 |
| 0158140 | 12/1981 | Japan | 524/787 |
| 0010604 | 1/1982 | Japan | 524/787 |
| 0074301 | 5/1982 | Japan | 524/787 |

Primary Examiner—Joseph L. Schofer
Assistant Examiner—J. M. Reddick
Attorney, Agent, or Firm—Oblon, Fisher, Spivak, McClelland & Maier

[57] ABSTRACT

A method for preparing a polymeric composition in which an inorganic compound is firmly consolidated in an organic polymer, which comprises polymerizing at least one radical polymerizable vinyl monomer in an aqueous medium polymerization system comprising an inorganic compound dispersed in the presence of an organic acid monomer or organic acid salt monomer, by using a radical polymerization initiator.

8 Claims, No Drawings

METHOD FOR PREPARING A POLYMERIC COMPOSITION

The present invention relates to a novel method for preparing a polymeric composition in which an inorganic compound is firmly consolidated in an organic polymer.

Heretofore, there have been active researches for the development of composite materials, wherein two or more materials are combined to mutually complement the properties of the respective materials to present a new useful function. In recent years, an attention has been drawn not only to mere application of an inorganic compound powder to a composite material as a filler, but also to a composite material such as a ceramic material, a magnetic material or a dental material, wherein a powder of an inorganic compound having a high level of function imparted thereto is combined with an organic polymer. However, in this case, the materials to be combined are mutually substantially different in their properties, and the interfacial affinity such as the compatibility or adhesion is poor. Thus, such a combination has inherent drawbacks such that the effectiveness of the combination can not adequately be improved, and the function of the inorganic compound powder itself can hardly adequately be utilized.

Various methods for modifying the surface properties of a powder have been proposed to overcome these drawbacks, to improve the interfacial affinity of the inorganic compound with the organic polymer substance and to attain high packing density, uniform dispersion and high strength. For instance, there may be mentioned a mechano-chemical method in which an inorganic compound is pulverized in the presence of a reactive monomer, followed by grafting an organic polymer, or a radiation method wherein an inorganic substance is irradiated with a high-energy radiation to be grafted with an organic polymer. These methods, however, require a grinding step or installation of a radiation equipment, resulting in complication of the manufacturing process and increase of the manufacturing cost, and present difficult problems for the practicability of the process.

Further, as an example for the surface modification of a powder in which an in situ polymerization for microcapsulation is employed, the present inventors have previously proposed a method for firmly consolidating an inorganic compound and an organic polymer, wherein a radical polymerizable vinyl monomer and an inorganic compound as a third component are contacted in the presence of a certain specific organic acid monomer or organic acid salt monomer (U.S. Pat. No. 4,435,540, issued on Mar. 6, 1984). However, this method is based on the non-catalytic polymerization of the vinyl monomer by the contact of the specific organic acid monomer or organic acid salt monomer with the inorganic compound, and thus has a problem that the degree of polymerization of the monomer and the graft rate i.e. the ratio of the organic polymer firmly consolidated to the formed polymer, are not necessarily adequate. Further, the applicable vinyl monomer is restricted to the one composed mainly of methyl acrylate or methyl methacrylate, and thus has a drawback that the useful monomer is rather limited.

It is an object of the present invention to provide a polymeric composition in which an organic polymer is uniformly and firmly bonded to the surface of an inorganic compound with a remarkably high degree of polymerization and graft rate.

The present invention provides a method for preparing a polymeric composition in which an inorganic compound is firmly consolidated in an organic polymer, which comprises polymerizing at least one radical polymerizable vinyl monomer in an aqueous medium polymerization system comprising an inorganic compound dispersed in the presence of an organic acid monomer or organic acid salt monomer, by using a radical polymerization initiator.

Now, the present invention will be described in detail with reference to the preferred embodiments.

The organic acid monomer or organic acid salt monomer is preferably a sulfonic acid monomer or sulfonate monomer of the formula:

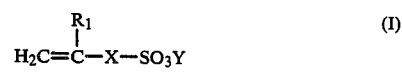

wherein $R_1$ is a hydrogen atom, a $C_1$-$C_{20}$ alkyl group or a halogen atom, X is

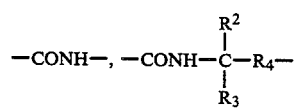

(wherein each of $R_2$ and $R_3$ is a hydrogen atom or a $C_1$-$C_{15}$ alkyl group, and $R_4$ is a $C_1$-$C_{15}$ alkylene group), -COO(CH$_2)_{\overline{m}}$ (wherein m is an integer of 1 to 20) or CH$_{\overline{2n}}$ (wherein n is an integer of 0 to 20), and Y is a hydrogen atom, an ammonium radical or an alkali metal atom; or a carboxylic acid monomer or carboxylate monomer of the formula:

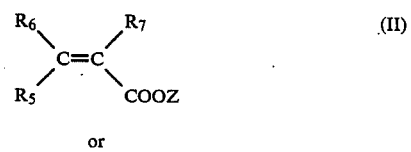

or

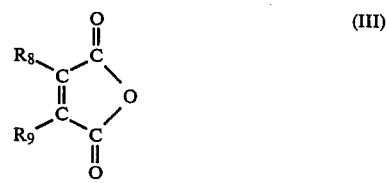

wherein each of $R_5$ and $R_6$ is a hydrogen atom, a $C_1$-$C_{15}$ alkyl group or —COOA (wherein A is a hydrogen atom, an ammonium radical or an alkali metal atom), $R_7$ is a hydrogen atom or a $C_1$-$C_{15}$ alkyl group, Z is a hydrogen atom, an ammonium radical or an alkali metal atom, and each of $R_8$ and $R_9$ is a hydrogen atom or a $C_1$-$C_{15}$ alkyl group.

A feature of the present invention is that the interaction between the surface of the inorganic compound and the polymer formed according to the method of the present invention, is derived from a firmly consolidated chemical bond beyond simple adsorption or physical adhesion by e.g. van der Waals adsorption.

Referring to a specific manner for carrying out the present invention, an inorganic compound is suspended and dispersed in an aqueous medium at a temperature within a range in which a radical polymerization initiator decomposes, and an organic vinyl monomer, a specific organic acid monomer or organic acid salt monomer and a radical polymerization initiator are added and stirred to conduct aqueous heterogeneous polymerization, whereupon a copolymer of the vinyl monomer with the organic acid monomer or organic acid salt monomer is uniformly and firmly bonded to the surface of the inorganic compound with a high degree of polymerization and graft rate in a predetermined period of polymerization.

In this case, if a usual dispersant such as a polyanion is used, the effect of the present invention can not be obtained.

The sulfonic acid monomer or sulfonate monomer of the formula I is required to have a double bond as an active site attributable to the polymerizability by a radical polymerization initiator and a sulfonic acid group as an active site which brings about a firm consolidation by the interaction with hydroxyl groups present on the surface of the inorganic compound and the resulting polymer. Any compound having a structure containing these functional groups can be employed. For instance, there may be employed 2-acrylamido-2-methylpropanesulfonic acid (hereinafter referred to simply as AMS), sodium 2-methacryloylethanesulfonate (hereinafter referred to simply as SEM-Na), sodium 3-methacryloylpropanesulfonate (hereinafter referred to simply as SPS), sodium 2-propenesulfonate (hereinafter referred to simply as NaAS) and sodium 2-methyl-2-propenesulfonate (hereinafter referred to simply as NaMS). Among them, particularly preferred are AMS containing an amide linkage and SEM-Na and SPS containing an ester linkage, as they have high polymerization activities and graft efficiency (i.e. efficiency for firm consolidation of the formed polymer).

The carboxylic acid monomer or carboxylate monomer of the formulas II and III, is required to have a double bond as an active site attributable to the polymerizability by a radical polymerization initiator and a carboxylic acid group as an active site which brings about a firm consolidation by the interaction with hydroxyl groups present on the surface of the organic compound and the formed polymer. Any compound having a structure containing these functional groups may be employed. For instance, there may be mentioned acrylic acid, methacrylic acid, crotonic acid, tiglic acid, cinnamic acid, maleic anhydride and citraconic anhydride. Among them, particularly preferred are acrylic acid, methacrylic acid, crotonic acid and maleic anhydride, as they have high polymerization activities and graft efficiency (i.e. efficiency for firm consolidation of the formed polymer).

As the inorganic compound to be used in the present invention, a carbide, nitride or boride of silicon or zirconium, or zirconium oxide is particularly preferred, in view of remarkable effects for the activation of the vinyl monomer and for the firm consolidation with the polymer.

As the vinyl monomer to be used in the present invention, any conventional radical polymerizable vinyl monomer may be employed.

As the radical polymerization initiator to be used in the present invention, any conventional peroxide or azo compound may be employed. However, a radical polymerization initiator which is decomposable at a temperature within a range of from 40° to 100° C. is particularly useful. Among them, particularly preferred from the viewpoint of the graft rate are peroxides such as benzoyl peroxide, azobisisobutyronitrile and potassium persulfate, and azo compounds.

Now, the present invention will be described in further detail with reference to Examples. However, it should be understood that the present invention is by no means restricted by these specific Examples. In the Examples and Comparative Examples, the term "parts" means "parts by weight" unless otherwise specified.

EXAMPLE 1 and COMPARATIVE EXAMPLES 1 to 5

In a 1000 ml four-necked flask equipped with a condensor, a nitrogen inlet, a stirrer and a thermocouple for detecting the internal temperature, 270.0 g of silicon nitride, used as the inorganic compound, was suspended in 700 ml of deionized water to form a dispersion. After flushing the flask with nitrogen for 30 minutes, 28.0 g of methyl methacrylate, used as the vinyl monomer, was added to the dispersion with vigorous stirring under a nitrogen stream. Then, the above reaction mixture was heated to 70° C. in a warm water bath. After confirming the uniform dispersion of the added monomer, a solution of 10.0 g of SEM-Na as the sulfonate monomer in 20 ml of deionized water and a solution of 1.0 g of benzoyl peroxide as the radical initiator in 2.0 g of methyl methacrylate, were gradually added thereto. The mixture was reacted for polymerization at the same temperature for 8 hours. After completion of the polymerization, about 5 g of the reaction mixture was sampled. The sample was tested for the amount of the remaining unreacted monomer by gas chromatography using dioxane as internal standard, and the conversion was obtained.

Further, the polymeric composition after the reaction was thoroughly dried at 105° C. for one day and night, and then about 5 g of the composition was completely burned at 650° C. for 3 hours, whereupon the amount of the polymer consolidated to the inorganic compound was calculated from the weight reduction. Then, the consolidation rate was obtained in accordance with the following formula:

$$\text{Consolidation rate (\%)} = \frac{\text{Amount of the polymer consolidated to the inorganic compound}}{\text{Amount of the formed polymer}} \times 100$$

For the purpose of comparison, similar polymerization operation and evaluation after the polymerization were conducted with respect to the polymerization behavior in the cases where the radical initiator was omitted as in the conventional non-catalytic polymerization system, the sulfonic acid monomer or sulfonate monomer was not added, and a dispersant was added. The results are shown in Table 1.

TABLE 1

| | Sulfonate monomer SEM-Na (parts)[*1] | Radical polymerization initiator BPO (parts) | Vinyl monomer MMA (parts) | Inorganic compound Silicon nitride (parts)[*2] | Dispersant Sodium hexa-metaphosphate | Deionized water (parts) | Conversion of monomer (%) | Consolidation rate (%)[*3] |
|---|---|---|---|---|---|---|---|---|
| Example 1 | 10.0 | 1.0 | 30.0 | 270.0 | — | 720 | −100 | 96 |
| Comparative Example 1 | 10.0 | — | 30.0 | 270.0 | — | 720 | 71 | 88 |
| Comparative Example 2 | — | 1.0 | 30.0 | 270.0 | — | 720 | 90 | 4 |
| Comparative Example 3 | 10.0 | 1.0 | 30.0 | 270.0 | 3.0 | 720 | 95 | 45 |

[*1] $CH_2=C.CH_3-COOC_2H_4-SO_3Na$
[*2] Special grade reagent
[*3] $\text{Amount of the polymer consolidated to the inorganic compound} \over \text{Amount of the formed polymer}$ × 100
BPO: Benzoyl peroxide, MMA: Methyl methacrylate It is evident from Table 1 that in the system of Comparative Example 2 wherein no sulfonic acid monomer or sulfonate monomer was added, the consolidation rate was very poor although a high conversion was obtainable, and a tendency for the separation of the inorganic compound and the homopolymer was observed. Further, it is evident that as compared with Comparative Example 1, the method of the present invention (Example 1) wherein a radical polymerization initiator was added, is superior in both the conversion of monomer and the consolidation rate. Further, in the system of Comparative Example 3 wherein a dispersant was added, the consolidation rate was substantially low, and a tendency for the separation of the homopolymer was observed as in the case of Comparative Example 2.

The polymeric compositions of Example 1 and Comparative Examples 1 to 3 as shown in Table 1, were continuously extracted by Soxhlet for 50 hours with benzene, 50 hours with acetone and 200 hours with dimethylforamide, as good solvents for methyl methacrylate-SEM-Na copolymers, whereby the reduction in the polymer contents was studied. The results are shown in Table 2. Here, the polymer content after being thoroughly extracted with dimethylformamide for 200 hours, was evaluated to be a graft rate in the sense that the polymer is firmly consolidated to the surface of the inorganic compound by means of a chemical bond. For the purpose of comparison, a similar extraction operation was conducted with respect to each of compositions (Comparative Examples 4 and 5) wherein an inorganic powder (silicon nitride) was coated with a polymer obtained by the solvent blending with polymethyl methacrylate or with a methyl methacrylate-SEM-Na copolymer whereby the reduction in the polymer content was compared.

TABLE 2

| | Preparation of polymeric composition[*1] | Polymer content before extraction (%) | Polymer content after continuous extraction[*4] (graft rate) % | Graft efficiency[*5] (%) |
|---|---|---|---|---|
| | Polymerization system | | | |
| Example 1 | Presence of SEM-Na (Present invention) | 9.6 | 9.1 | 90 |
| Comparative Example 1 | Non-catalytic polymerization system without addition of BPO | 6.5 | 1.8 | 23 |
| Comparative Example 2 | No addition of SEM-Na as opposed to Example 1 | 1.1 | −0.0 | −0 |
| Comparative Example 3 | Addition of dispersant as opposed to Example 1 | 4.5 | 0.9 | 8.6 |
| | Blend system | | | |
| Comparative Example 4 | Solvent blend of polymethyl methacrylate[*2] | 9.6 | −0.0 | — |
| Comparative Example 5 | Solvent blend of methyl methacrylate-SEM-Na copolymer[*3] | 9.5 | −0.0 | — |

[*1] Silicon nitride was used as the inorganic compound.
[*2] Acrypet (VH), manufactured by Mitsubishi Rayon Co., Ltd., was used.
[*3] A copolymer prepared in the same manner as in Example 1 except that the method of the present invention was conducted in the absence of the inorganic compound, was used.
[*4] Continuous extraction by Soxhlet for 50 hours with benzene, 50 hours with acetone and 200 hours with dimethylformamide.
[*5] $\text{Amount of the polymer firmly consolidated to the inorganic compound by chemical bond} \over \text{Amount of the formed polymer}$ × 100

The polymer components in the compositions of Comparative Examples 2, 4 and 5 were completely extracted by the above continuous extraction operation irrespective of the system being of a polymerization type or of a solvent blend type. This indicates that even in the polymerization system, a polymer forming in the absence of a sulfonic acid monomer or sulfonate monomer, is merely chemically or physically adsorbed on the surface of the inorganic compound. In Comparative Examples 1 and 3, a part of the formed polymer was firmly consolidated to the inorganic compound, but the level of the graft rate was very low. Whereas, in Example 1 according to the method of the present invention wherein a radical polymerization initiator was added in the presence of a sulfonic acid monomer or sulfonate monomer, the extracted rate after the series of severe extraction operations, was very small, indicating a high graft rate. Further, even when the polymeric composition was subjected to washing treatment with an aqueous NaOH solution, it showed a high graft rate substantially equal to the level after the extraction operations. Thus, it was confirmed that the firm consolidation of the polymer to the surface of the inorganic compound was attributable to the presence of a covalent bond-type graft linkage as a chemical bond stronger than a hydrogen bond or ionic bond at the interface.

EXAMPLES 2 to 5

The polymerization was carried out in the same manner as in Example 1, except that SPS, AMS, NaAS or NaMS was used as the sulfonic acid monomer or sulfonate monomer instead of SEM-Na. The graft efficiency was measured, and the results are shown in Table 3.

As is apparent from Table 4, the graft efficiency is higher with lipophilic radical polymerization initiators such as BPO, LPO and AIBN than with water-soluble AIBA and KPS.

EXAMPLES 10 and 11

The reaction was conducted in the same manner as in Example 1 except that the vinyl monomer identified in Table 5 was used instead of methyl methacrylate as the vinyl monomer, and the compositions thereby obtained were evaluated. The results are shown in Table 5.

TABLE 3

|  | Acid monomer | Amounts (parts) | Radical polymerization initiator BPO (parts) | Vinyl monomer MMA (parts) | Inorganic compound Silicon nitride(parts) | Deionized water (parts) | Graft efficiency (%) |
| --- | --- | --- | --- | --- | --- | --- | --- |
| Example 1 | SEM-Na | 10.0 | 1.0 | 30.0 | 270.0 | 720 | 90 |
| Example 2 | SPS*[1] | 10.5 | 1.0 | 30.0 | 270.0 | 720 | 92 |
| Example 3 | AMS*[2] | 9.9 | 1.0 | 30.0 | 270.0 | 720 | 90 |
| Example 4 | NaAS*[3] | 6.5 | 1.0 | 30.0 | 270.0 | 720 | 75 |
| Example 5 | NaMS*[4] | 7.1 | 1.0 | 30.0 | 270.0 | 720 | 78 |

*[1] $CH_2=C.CH_3-COOC_3H_6-SO_3Na$
*[2] $CH_2=CH-CONH-(CCH_3)_2CH_2SO_3H$
*[3] $CH_2=CHCH_2SO_3Na$
*[4] $CH_2=C.CH_3-CH_2SO_3Na$

TABLE 5

|  | Vinyl monomer | Amount (parts) | Acid monomer SEM-Na (parts) | Radical polymerization BPO (parts) | Inorganic compound Silicon nitride(parts) | Deionized water (parts) | Graft efficiency (%) |
| --- | --- | --- | --- | --- | --- | --- | --- |
| Example 1 | MMA | 30.0 | 10.0 | 1.0 | 270.0 | 720 | 90 |
| Example 10 | ST | 30.0 | 10.0 | 1.0 | 270.0 | 720 | 76 |
| Example 11 | AN | 30.0 | 10.0 | 1.0 | 270.0 | 720 | 74 |

MMA: Methyl methacrylate, ST: Styrene, AN: Acrylonitrile

As is apparent from Table 3, the graft efficiency was very high with SEM-Na, SPS and AMS.

EXAMPLES 6 to 9

The reaction was conducted in the same manner as in Example 1 except that the type of the radical polymerization initiator was changed, and the compositions thereby obtained were evaluated. The results are shown in Table 4.

As is apparent from Table 5, according to the method of the present invention, a high graft efficiency can be attained with either one of the vinyl monomers (Examples 10 and 11).

EXAMPLE 12

The reaction was conducted in the same manner as in Example 1 except that the type of the inorganic compound was changed, and the composition thereby obtained was evaluated. The results are shown in Table 6.

TABLE 4

|  | Radical polymerization initiator | Amount (parts) | Acid monomer SEM-Na (parts) | Vinyl monomer MMA (parts) | Inorganic compound Silicon nitride(parts) | Deionized water (parts) | Graft efficiency (%) |
| --- | --- | --- | --- | --- | --- | --- | --- |
| Example 1 | BPO | 1.0 | 10.0 | 30.0 | 270.0 | 720 | 90 |
| Example 6 | LPO*[1] | 1.0 | 10.0 | 30.0 | 270.0 | 720 | 93 |
| Example 7 | AIBN*[2] | 1.0 | 10.0 | 30.0 | 270.0 | 720 | 90 |
| Example 8 | AIBA*[3] | 1.0 | 10.0 | 30.0 | 270.0 | 720 | 70 |
| Example 9 | KPS*[4] | 1.0 | 10.0 | 30.0 | 270.0 | 720 | 73 |

*[1] Lauroyl peroxide
*[2] Azobisisobutyronitrile
*[3] 2,2'-Azobis(2-aminodipropane)hydrochloride
*[4] Potassium persulfate

TABLE 6

|  | Inorganic Compound | Amount (parts) | Acid monomer SEM-Na (parts) | Radical polymerization BPO (parts) | Vinyl monomer MMA (parts) | Deionized water (parts) | Graft efficiency (%) |
| --- | --- | --- | --- | --- | --- | --- | --- |
| Example 1 | Silicon carbide | 270.0 | 10.0 | 1.0 | 30.0 | 720 | 92 |
| Example 2 | Zirconium oxide | 270.0 | 10.0 | 1.0 | 30.0 | 720 | 93 |

TABLE 6-continued

| | Inorganic Compound | Amount (parts) | Acid monomer SEM-Na (parts) | Radical polymerization BPO (parts) | Vinyl monomer MMA (parts) | Deionized water (parts) | Graft efficiency (%) |
|---|---|---|---|---|---|---|---|
| Example 3 | Zirconium nitride | 270.0 | 10.0 | 1.0 | 30.0 | 720 | 94 |
| Example 4 | Zirconium boride | 270.0 | 10.0 | 1.0 | 30.0 | 720 | 91 |
| Example 5 | Zirconium carbide | 270.0 | 10.0 | 1.0 | 30.0 | 720 | 90 |

As is apparent from Table 6, the method of the present invention is superior to the conventional noncatalytic polymerization system in both the polymerization degree and the graft efficiency, and thus indicates that it is capable of providing a polymeric composition of a higher quality.

EXAMPLE 13 and COMPARATIVE EXAMPLES 6 to 9

As an evaluation of the applicability of the polymeric composition obtained by the method of the present invention to a composite material, a combination of the polymeric composition with polymethyl methacrylate as matrix (inorganic compound content: 80 wt. %) was press-molded at 200° C. under 20 kg/cm$^2$, and the molded product was evaluated for the outer appearance and bending strength. The results are shown in Table 7.

As is apparent from Table 7, according to the method of the present invention (Example 13), a substantial improvement in the effects of the combination is observed with respect to the outer appearance and strength of the molded product.

EXAMPLE 14 and COMPARATIVE EXAMPLES 10 to 14

The polymerization and evaluation were conducted in the same manner as in Example 1 except that methacrylic acid as a carboxylic acid monomer was used instead of the sulfonate monomer. For the purpose of comparison, similar polymerization operation and evaluation after the polymerization were conducted with respect to the polymerization behavior in the cases where no radical polymerization initiator was added as in the conventional non-catalytic polymerization system, no carboxylic acid monomer was added, and a dispersant was added. The results are shown in Table 8.

TABLE 7

| | Polymeric composition | Polymer content (%) | Composite material composition*1 | | Outer appearance of molded product | Bending strength (kg/cm$^2$) |
|---|---|---|---|---|---|---|
| | | | Polymeric composition (parts) | PMMA (parts) | | |
| Example 13 | Example 1 Present invention | 9.6 | 88 | 12 | ⊚ | 283 |
| Comparative Example 6 | Compartative Example 1 Non-catalytic polymerization system without addition of BPO | 6.5 | 86 | 14 | Δ | 190 |
| Comparative Example 7 | Comparative Example 2 No addition of SEM-Na as opposed to Example 1 | 1.1 | 81 | 19 | X | 72 |
| Comparative Example 8 | Comparative Example 3 Addition of dispersant as opposed to Example 1 | 4.5 | 84 | 16 | Δ | 140 |
| Comparative Example 9 | Non-treated silicon nitride | — | 80 | 20 | ※ | 64 |

*1 The ratio of inorganic compound/organic compound = 80/20.
PMMA: Polymethyl methacrylate, Acrypet (VH), manufactured by Mitsubishi Rayon Co., Ltd.
⊚: Good, Δ: Fair, X: Poor, ※: Bad

TABLE 8

| | Carboxylic acid monomer Methyl methacrylic acid*1 | Radical polymerization initiator BPO (parts) | Vinyl monomer MMA (parts) | Inorganic compound Silicon nitride (parts)*2 | Dispersant Sodium hexa-metaphosphate (parts) | Deionized water (parts) | Conversion of monomer (%) | Consolidation rate (%)*3 |
|---|---|---|---|---|---|---|---|---|
| Example 14 | 10.0 | 1.0 | 30.0 | 270.0 | — | 720 | −100 | 98 |
| Comparative Example 10 | 10.0 | — | 30.0 | 270.0 | — | 720 | 73 | 90 |
| Comparative Example 11 | — | 1.0 | 30.0 | 270.0 | — | 720 | 90 | 5 |
| Comparative | 10.0 | 1.0 | 30.0 | 270.0 | 3.0 | 720 | 93 | 41 |

TABLE 8-continued

| | Carboxylic acid monomer Methyl methacrylic acid*1 | Radical polymerization initiator BPO (parts) | Vinyl monomer MMA (parts) | Inorganic compound Silicon nitride (parts)*2 | Dispersant Sodium hexa-metaphosphate (parts) | Deionized water (parts) | Conversion of monomer (%) | Consolidation rate (%)*3 |
|---|---|---|---|---|---|---|---|---|
| Example 12 | | | | | | | | |

*1 $CH_2=C(CH_3)COOH$
*2 Special grade reagent
*3 $\dfrac{\text{Amount of the polymer consolidated to the inorganic compound}}{\text{Amount of the formed polymer}} \times 100$
BPO: Benzoly peroxide, MMA: Methyl methacrylate It is evident from Table 8 that in the system where no carboxylic acid monomer was added as in Comparative Example 11, the consolidation rate was very low although the conversion was high, and a tendency for separation of the inorganic compound and the homopolymer was observed. It was further evident that as compared with Comparative Example 10, the method of the present invention is superior in both the conversion of monomer and the consolidation rate. Further, in the system of Comparative Example 12 wherein a dispersant was added, the consolidation rate was substantially low, and a tendency for the separation of the homopolymer was observed as in the case of Comparative Example 11.

The polymeric compositions of Example 14 and Comparative Examples 10 to 12 as shown in Table 8, were continuously extracted by Soxhlet for 50 hours with benzene, 50 hours with acetone and 200 hours with dimethylformamide, as good solvents for methyl methacrylate-methacrylic acid copolymers, whereby the reduction in the polymer contents was studied. The results are shown in Table 9. Here, the polymer content after being thoroughly extracted with dimethylformamide for 200 hours, was evaluated to be a graft rate in the sense that the polymer is firmly consolidated to the surface of the inorganic compound by means of a chemical bond. For the purpose of comparison, a similar extraction operation was conducted with respect to each of compositions (Comparative Examples 13 and 14) wherein an inorganic powder (silicon nitride) was coated, with a polymer obtained by the solvent blending with polymethyl methacrylate or with a methyl methacrylate-methacrylic acid copolymer whereby the reduction in the polymer content was compared.

TABLE 9

| | Preparation of polymeric composition*1 | Polymer content before extraction (%) | Polymer content after continuous extraction*4 (graft rate) % | Graft efficiency*5 (%) |
|---|---|---|---|---|
| | Polymerization system | | | |
| Example 14 | Presence of methacrylic acid (present invention) | 9.7 | 9.2 | 92 |
| Comparative Example 10 | Non-catalytic polymerization system without addition of BPO | 6.9 | 2.0 | 26 |
| Comparative Example 11 | No addition of methacrylic acid as opposed to Example 14 | 1.1 | −0.0 | −0 |
| Comparative Example 12 | Addition of dispersant as opposed to Example 14 | 4.1 | 0.7 | 6.8 |
| | Blend system | | | |
| Comparative Example 13 | Solvent blend of polymethyl methacrylate*2 | 9.5 | −0.0 | — |
| Comparative Example 14 | Solvent blend of methyl methacrylate-methylmethacrylic acid copolymer*3 | 9.6 | −0.0 | — |

*1 Silicon nitride was used as the inorganic compound.
*2 Acrypet (VH), manufactured by Mitsubishi Rayon Co., Ltd., was used.
*3 A copolymer prepared in the same manner as in Example 14 except that the method of the present invention was conducted in the absence of the inorganic compound, was used.
*4 continuous extraction by Soxhlet for 50 hours with benzene, 50 hours with acetone and 200 hours with dimethylformamide.
*5 $\dfrac{\text{Amount of the polymer firmly consolidated to the inorganic compound by chemical bond}}{\text{Amount of the formed polymer}} \times 100$ The polymer components in the compositions of Comparative Examples 11, 13 and 14 were completely extracted by the above continuous extraction operation irrespective of the system being of a polymerization type or of a solvent blend type. This indicates that even in the polymerization system, a polymer forming in the absence of a carboxylic acid monomer, is merely chemically or physically adsorbed on the surface of the inorganic compound. In Comparative Examples 10 and 12, a part of the formed polymer was firmly consolidated to the inorganic compound, but the level of the graft rate was very low. Whereas, in Example 14 according to the method of the present invention wherein a radical polymerization initiator was added in the presence of a carboxylic acid monomer, the extracted rate after the series of severe extraction operations, was very small, indicating a high graft rate. Further, even when the polymeric composition was subjected to washing treatment with an aqueous NaOH solution, it showed a high graft rate substantially equal to the level after the extraction operations. Thus, it was confirmed that the firm consolidation of the polymer to the surface of the inorganic compound was attributable to the presence of a covalent bond-type graft linkage as a chemical bond stronger than a hydrogen bond or ionic bond at the interface.

EXAMPLES 15 to 19

The polymerization was carried out in the same manner as in Example 14, except that acrylic acid, crotonic acid, tiglic acid, cinnamic acid or maleic anhydride was used as the carboxylic acid monomer instead of methacrylic acid. The graft efficiency was measured, and the results are shown in Table 10.

EXAMPLES 24 and 25

The reaction was conducted in the same manner as in Example 14 except that the vinyl monomer identified in Table 12 was used instead of methyl methacrylate as the vinyl monomer, and the compositions thereby obtained were evaluated. The results are shown in Table 12.

TABLE 10

| | Carboxylic acid monomer | Amount (parts) | Radical polymerization initiator BPO (parts) | Vinyl monomer MMA (parts) | Inorganic compound Silicon nitride (parts) | Deionized water (parts) | Graft efficiency (%) |
|---|---|---|---|---|---|---|---|
| Example 14 | Methacrylic acid | 10.0 | 1.0 | 30.0 | 270.0 | 720 | 92 |
| Example 15 | Acrylic acid*1 | 7.6 | 1.0 | 30.0 | 270.0 | 720 | 94 |
| Example 16 | Crotonic acid*2 | 10.0 | 1.0 | 30.0 | 270.0 | 720 | 92 |
| Example 17 | Tiglic acid*3 | 11.4 | 1.0 | 30.0 | 270.0 | 720 | 71 |
| Example 18 | Cinnamic acid*4 | 16.7 | 1.0 | 30.0 | 270.0 | 720 | 78 |
| Example 19 | Maleic anhydride*5 | 11.0 | 1.0 | 30.0 | 270.0 | 720 | 90 |

*1 $CH_2=CHCO_2H$
*2 $CH_3CH=CHCO_2H$
*3 $CH_3CH=C(CH_3)CO_2H$
*4 $C_6H_5CH=CHCO_2H$
*5

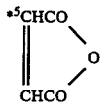

As is apparent from Table 10, the graft efficiency was very high with methacrylic acid, acrylic acid, crotonic acid and maleic anhydride.

TABLE 12

| | Vinyl monomer | Amount (parts) | Carboxylic acid monomer Methacrylic acid (parts) | Radical polymerization BPO (parts) | Inorganic compound Silicon nitride(parts) | Deionized water (parts) | Graft efficiency (%) |
|---|---|---|---|---|---|---|---|
| Example 14 | MMA | 30.0 | 10.0 | 1.0 | 270.0 | 720 | 92 |
| Example 24 | ST | 30.0 | 10.0 | 1.0 | 270.0 | 720 | 78 |
| Example 25 | AN | 30.0 | 10.0 | 1.0 | 270.0 | 720 | 72 |

MMA: Methyl methacrylate, ST: Styrene, AN: Acrylonitrile

EXAMPLES 20 to 30

The reaction was conducted in the same manner as in Example 14 except that the type of the radical polymerization initiator was changed, and the compositions thereby obtained were evaluated. The results are shown in Table 11.

As is apparent from Table 12, according to the method of the present invention, a high graft efficiency can be attained with either one of the vinyl monomers (Examples 24 and 25). The applicability of a wide range of vinyl monomers is a feature of the present invention in addition to the features of the high conversion and graft rate.

TABLE 11

| | Radical polymerization initiator | Amount (parts) | Carboxylic acid monomer Methacrylic acid (parts) | Vinyl monomer MMA (Parts) | Inorganic compound Silicon nitride(parts) | Deionized water (parts) | Graft efficiency (%) |
|---|---|---|---|---|---|---|---|
| Example 14 | BPO | 1.0 | 10.0 | 30.0 | 270.0 | 720 | 92 |
| Example 20 | LPO*1 | 1.0 | 10.0 | 30.0 | 270.0 | 720 | 95 |
| Example 21 | AIBN*2 | 1.0 | 10.0 | 30.0 | 270.0 | 720 | 92 |
| Example 22 | AIBA*3 | 1.0 | 10.0 | 30.0 | 270.0 | 720 | 72 |
| Example 23 | KPS*4 | 1.0 | 10.0 | 30.0 | 270.0 | 720 | 75 |

*1 Lauroyl peroxide
*2 Azobisisobutyronitrile
*3 2,2'-Azobis(2-aminodipropane)hydrochloride
*4 Potassium persulfate As is apparent from Table 11, the graft efficiency was higher with lipophilic radical polymerization initiators such as BPO, LPO and AIBN than with water-soluble AIBA and KPS.

EXAMPLE 26

The reaction was conducted in the same manner as in Example 14 except that the type of the inorganic compound was changed, and the composition thereby obtained was evaluated. The results are shown in Table 13.

TABLE 13

|  | Inorganic compound | Amount (parts) | Carboxylic acid monomer Methacrylic acid (parts) | Radical polymerization BPO (parts) | Vinyl monomer MMA (parts) | Deionized water (parts) | Graft efficiency (%) |
| --- | --- | --- | --- | --- | --- | --- | --- |
| Example 1 | Silicon carbide | 270.0 | 10.0 | 1.0 | 30.0 | 720 | 94 |
| Example 2 | Zirconium oxide | 270.0 | 10.0 | 1.0 | 30.0 | 720 | 95 |
| Example 3 | Zirconium nitride | 270.0 | 10.0 | 1.0 | 30.0 | 720 | 96 |
| Example 4 | Zirconium boride | 270.0 | 10.0 | 1.0 | 30.0 | 720 | 93 |
| Example 5 | Zirconium carbide | 270.0 | 10.0 | 1.0 | 30.0 | 720 | 92 |

As is apparent from Table 13, the method of the present invention is superior to the conventional noncatalytic polymerization system in both the polymerization degree and the graft efficiency, and thus indicates that it is capable of providing a polymeric composition of a higher quality.

EXAMPLE 27 and COMPARATIVE EXAMPLES 15 to 18

As an evaluation of the applicability of the polymeric composition obtained by the method of the present invention to a composite material, a combination of the polymeric composition with polymethyl methacrylate as matrix (inorganic compound content: 80 wt. %) was press-molded at 200° C. under 20 kg/cm², and the molded product was evaluated for the outer appearance and bending strength. The results are shown in Table 14.

TABLE 14

|  | Polymeric composition | Polymer content (%) | Composite material composition*1 | | Outer appearance of molded product | Bending strength (kg/cm²) |
| --- | --- | --- | --- | --- | --- | --- |
|  |  |  | Polymeric composition (parts) | PMMA (parts) |  |  |
| Example 27 | Example 14 Present invention | 9.7 | 88 | 12 | ○ | 288 |
| Comparative Example 15 | Comparative Example 10 Non-catalytic polymerization system without addition of BPO | 6.9 | 86 | 14 | △ | 193 |
| Comparative Example 16 | Comparative Example 11 No addition of methacrylic acid as opposed to Example 14 | 1.1 | 81 | 19 | X | 72 |
| Comparative Example 17 | Comparative Example 12 Addition of dispersant as opposed to Example 14 | 4.1 | 83 | 17 | △ | 120 |
| Comparative Example 18 | Non-treated silicon nitride | — | 80 | 20 | ※ | 64 |

*1The ratio of inorganic compound/organic compound = 80/20.
PMMA: Polymethyl methacrylate, Acrypet (VH), manufactured by Mitsubishi Rayon Co., Ltd.
○: Good, △: Fair, X: Poor, ※: Bad As is apparent from Table 14, according to the method of the present invention (Example 27), a substantial improvement in the effects of the combination is observed with respect to the outer appearance and strength of the molded product.

We claim:

1. A method for preparing a polymeric composition having an inorganic compound firmly consolidated thereinto, which comprises polymerizing at least one radical polymerizable vinyl monomer using a peroxide or azo compound radical initiatior in an aqueous polymerization medium, which medium comprises an inorganic compound dispersed in the presence of an organic acid monomer or organic acid salt monomer, wherein said inorganic compound is selected from the group consisting of a carbide, nitride and boride of silicon and ziroconium, and zirconium oxide; and wherein said organic acid monomer and organic acid salt monomer is a sulfonic acid monomer or sulfonate monomer of the formula:

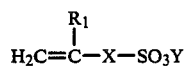

wherein $R_1$ is a hydrogen atom, a $C_1$-$C_{20}$ alkyl group or a halogen atom; X is —CONH— or

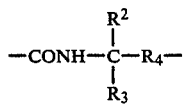

wherein each of $R_2$ and $R_3$ is a hydrogen atom or a $C_1$-$C_{15}$ alkyl group; and $R_4$ is a $C_1$-$C_{15}$ alkylene group, —COO(CH$\overline{_{2m}}$, wherein m is an integer of 1 to 20 or CH$\overline{_{2n}}$, wherein n is an integer of 0 to 20; and Y is a hydrogen atom, an ammonium radical or an alkali metal atom.

2. The method according to claim 1, wherein the inorganic compound is a carbide, nitride or boride of silicon or zirconium.

3. The method according to claim 1, wherein the inorganic compound is zirconium oxide.

4. The method according to claim 1, wherein the sulfonic acid monomer or sulfonate monomer is 2-acrylamido-2-methylpropanesulfonic acid, sodium 2-methacryloylethanesulfonate, sodium 3-methacryloylpropanesulfonate, sodium 2-propenesulfonate or sodium 2-methyl-2-propenesulfonate.

5. The method according to claim 1, wherein the radical polymerization initiator is decomposable at a temperature within a range of from 40° to 100° C.

6. The method according to claim 2, wherein said inorganic compound is silicon carbide.

7. The method according to claim 4, wherein said sulfonate monomer is sodium 2-methacryloylethanesulfonate.

8. The method according to claim 1, wherein said polymerizable vinyl monomer is methyl methacrylate.